United States Patent [19]

van Geenen et al.

[11] Patent Number: 4,540,516
[45] Date of Patent: Sep. 10, 1985

[54] PROCESS FOR THE PREPARATION OF AN N-SUBSTITUTED CARBAMOYL-LACTAM COMPOUND

[75] Inventors: Albert A. van Geenen, Brunssum; Joseph J. M. Bongers, Elsloo; Jozef L. M. van der Loos, Sittard, all of Netherlands

[73] Assignee: Stamicarbon B.V., Licensing Subsidiary of DSM, Geleen, Netherlands

[21] Appl. No.: 641,772

[22] Filed: Aug. 17, 1984

[30] Foreign Application Priority Data

Aug. 20, 1983 [NL] Netherlands .......................... 8302929

[51] Int. Cl.$^3$ ............................................. C07D 223/10
[52] U.S. Cl. ............................................. 260/239.3 R
[58] Field of Search ................................. 260/239.3 R

[56] References Cited

U.S. PATENT DOCUMENTS

| | | | |
|---|---|---|---|
| 3,704,280 | 11/1972 | van der Loos | 260/77.5 |
| 4,191,819 | 3/1980 | Meyer et al. | 528/315 |
| 4,211,699 | 7/1980 | Winkelmann | 260/239.3 R |
| 4,313,876 | 2/1982 | Gras | 260/239.3 R |

FOREIGN PATENT DOCUMENTS 57-33014  9/1983  Japan .

*Primary Examiner*—Paul R. Michl
*Attorney, Agent, or Firm*—Cushman, Darby & Cushman

[57] ABSTRACT

The invention concerns a simple, reliable and reproducable process for the preparation of an N-substituted carbamoyl lactam compound, for example of the following formula:

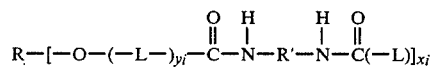

where:
R is a polyol originating from a polyol having the formula R-(OH)$_{xi}$, where
$x_i$ is an integer $\geq 2$
R' is an alkyl, aralkyl, alkaryl or aryl group, whether or not cyclic,
$y_i$ is an integer $\geq 0$,
(—L) is an unopened lactam ring and
(—L—) is an opened lactam block.

This process is characterized in that a polyol and a lactam blocked polyisocyanate are reacted in the liquid state in the presence of a metal compound catalyst.

15 Claims, No Drawings

PROCESS FOR THE PREPARATION OF AN N-SUBSTITUTED CARBAMOYL-LACTAM COMPOUND

BACKGROUND OF THE INVENTION

The invention relates to a process for the preparation of an N-substituted carbamoyl-lactam compound.

In the anionic polymerization of lactams, such as caprolactam, N-substituted carbamoyl-lactam compounds are suitable promoters, or activators, for the polymerization. These compounds can be used in the reaction-injection-molding (RIM) of nylon. Such compounds can provide short reaction times, which makes it possible to polymerize the lactam in the mold, without unduly long polymerization times.

Basically the reaction injection molding (RIM) method is a one-shot injection of liquid components, usually by impingement, into a closed mold where rapid polymerization occurs thereby resulting in a molded plastic product.

In a RIM process, viscosity of the materials fed to a mold is about 50 cps to 10,000 cps, preferably about 1500 cps, at injection temperatures varying from room temperature for urethanes to about 150° C. for lactams. Mold temperatures in a RIM process typically range from about 100° C. to about 220° C. The mold pressures generally range from about 1 bar to 100 bar and more particularly, range from about 1 bar to about 30 bar. At least one component in th RIM formulation consists of monomers and adducts thereof that are polymerized to a polymer in the mold.

RIM differs from injection molding in a number of important respects. The main distinction between injection molding and RIM resides in the fact that in RIM, a chemical reaction takes place in the mold to transform a monomer or adducts to a polymeric state. Injection molding is conducted at pressures of about 700 bar to 1400 bar in the mold cavity by melting a solid resin and conveying it into a mold maintained at room temperature and the molten resin at about 150° to 350° C.

The pressures employed in the RIM method are much lower than in conventional injection molding processes. At injection temperature of about 150° C. to 350° C., viscosity of the molten resin in an injection molding process is generally in the range of 50,000 cps to 1,000,000 cps and typically about 200,000 cps. In injection molding process, solidification of the resins occurs in about 10 seconds to 90 seconds, depending on the size of the molded product, following which, the molded product is removed from the mold. There is no chemical reaction taking place in an injection molding process when the resin is introduced into a mold.

For practical purposes, in a RIM-process the chemical reaction must take place rapidly in less than about 2 minutes for smaller items.

The following developments in the anionic polymerization nylon are known.

The polymerization of a lactam to obtain nylon has been known for many years.

In U.S. Pat. No. 3,018,273 a process for the in situ polymerization of caprolactam is described, wherein an organomagnesium compound is used as an initiator, and an N,N diacyl compound is used as promoter (or activator).

British Pat. No. 1,067,153 describes a process for preparing nylon-block-copolymers by anionically polymerizing caprolactam in the presence of various activators suitable for preparing nylon 6 polymers. Preparation of nylon block copolymers using an isocyanate terminated polypropylene glycol and a potassium based catalyst is described; a nylon block copolymer containing at least one polyether block is thereby formed.

In U.S. Pat. Nos. 3,862,262, 4,031,164, 4,034,015 and 4,223,112 various aspects of the preparation of nylon block copolymers from caprolactam in the presence of an acyllactam activator are described.

U.S. Pat. Nos. 4,031,164 and 4,223,112 describe the lactam-polyol-polyacyl-lactam-block terpolymers having a specified ratio of the various components. More particularly, the former patent discloses the use of 18% to 90% by weight of polyol blocks in the terpolymer.

U.S. Pat. No. 3,862,262 describes lactam-polyol-acyl-polylactam block-terpolymers.

U.S. Pat. No. 4,034,015 is directed to lactam-polyol-polyacyl-lactam or lactam-polyol-acyl-polylactam block terpolymers having at least about 5% ester end group termination.

Reissue patent 30,371 describes preparing polyester-polyamide compounds by condensation of an alcohol and acyllactams in the presence of at least one of a Group IA, IIA, IIB, and IIIA metal or metal compound.

U.S. Pat. No. 3,925,325 describes a catalyzed process for the preparation of monomeric and/or polymeric compounds such as esters, polyesters, ester amides, and polyester-polyamides which result from the reaction of an imide and an alcohol in the presence of an organoaluminium, imide-alcohol condensation catalyst.

U.S. Pat. No. 3,965,075 describes using an amide or a Group IVA, IB, IVB, VB, VIB, or VIII organometal compound for this condensation.

In European patent application No. 67693, now laid open to public inspection, acid halide materials and acyllactam functional materials are described as useful in the preparation of nylon block copolymers selected from the group consisting of those having the formula:

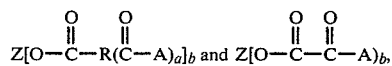

wherein
A is X or Q,
X is halogen,
Q is

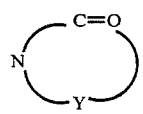

with
Y=$C_3$-$C_{11}$ alkylene;
a is an integer equal to 1, 2 or 3;
b is an integer equal to or greater than 2;
R is a di- or polyvalent group selected from hydrocarbon groups and hydrocarbon groups containing ether linkages; and
Z is a segment of:
(1) a polyester having a minimum molecular weight of 2,000,
(2) a polyester containing polyester segments having minimum molecular weights of about 2000, (3) a segment of a hydrocarbon or
(4) a polysiloxane.

European patent application No. 67,695, now laid open to public inspection, describes a process for preparing a nylon block copolymer by reactively contacting lactam monomer, basic lactam polymerization catalyst and the acyllactam functional material described in European patent application No. 67,693.

European patent application No. 67,694, now laid open for public inspection is directed to acid halide and acyllactam functional materials and to a process for the preparation of nylon block copolymers therewith. The acid halide or acyllactam functional materials are selected from the group defined by a complex formula.

Sibal et al, Designing Nylon 6 Polymerization Systems for RIM', apparently presented in part at the 2nd International Conference on Reactive Polymer Processing, Pittsburgh, Pa., in November 1982, described preparing various initiators for anionically polymerizing lactams including a polymeric initiator. This initiator is prepared by reacting hexamethylene diisocyanate (HDI) with a polypropylene oxide diol, having an average molecular weight of 2000, by slow addition of the polyol (1 mole) to two moles of HDI. The resulting product was reacted with anhydrous lactam at 80° C. No mechanical properties data are reported on the final product. Indeed, further work is said to be required to begin exploring the processability and properties of the products. This paper also reports that reaction and other process governing parameters are not known and further work is required.

U.S. Pat. No. 4,400,490 describes the anionic polymerization of a lactam with an epoxy-compound in the presence of a basic catalyst and a promoter. The epoxy compound can be the reaction product of a polymeric polyol and an epoxy compound.

U.S. Pat. No. 3,793,399 describes the use of a polyol, soluble in molten caprolactam, for improving the impact resistance of polycaprolactam. An organic nitrogen compound is used as a promoter in the polymerization.

The use of etherified polyols in the anionic polymerization of caprolactam is described in U.S. Pat. No. 3,770,689.

SUMMARY AND OBJECTS OF THE INVENTION

The invention concerns a simple, reliable and reproducable process for the preparation of an N-substituted carbamoyl lactam compound, for example of the following formula:

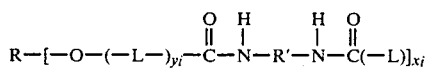

where:
R is a polyol originating from a polyol having the formula $R-(OH)_{x_i}$, where
$x_i$ is an integer $\geq 2$
R' is an alkyl, aralkyl, alkaryl or aryl group, whether or not cyclic,
$y_i$ is an integer $\geq 0$,
(—L) is an unopened lactam ring and
(—L—) is an opened lactam block.

This process is broadly characterized in that a polyol and a lactam blocked polyisocyanate are reacted in the liquid state in the presence of a metal compound catalyst.

The present invention to provide a reliable, simple an reproducable process for preparing N-substituted carbamoyl-lactam compounds, which compounds can be used to prepare impact resistant nylon block copolymers.

The process according to the present invention is very useful for preparing compounds which may be used in the preparation of nylon block copolymers, such as in RIM-nylon systems (Reaction Injection Molding). When the compounds obtained according to the present invention are employed in a RIM-nylon system, the lactam polymerization rate is very rapid. In addition, this process is important to processors for preparing of polyurethane resins used, for example, in coatings.

DETAILED DESCRIPTION OF THE INVENTION

The process according to the invention is characterized in that a polyol and a lactam blocked polyisocyanate are reacted in the liquid state in the presence of a suitable catalyst. The reaction temperature can most advantageously be between the melting point of the lactam and 150° C. The reaction is preferably carried out in molten lactam. More particularly, the reaction is conducted in molten caprolactam.

Surprisingly and quite unexpectedly, the reaction between a polyol and a lactam-blocked diisocyanate in the presence of a metal catalyst, at a low temperature, proceeds quickly. Moreover, virtually no polymerization of the lactam itself occurs, if at all.

Also, and quite unexpectedly, this process is especially well-suited for 1,6-hexane diisocyanate. Indeed, it has surprisingly been found that the reaction with a polyol can be selectively carried out with a symmetrical, lactam-blocked diisocyanate and an alkali earth metal.

By the term 'lactam-blocked-poly- or diisocyanate' is meant the reaction product of a polyisocyanate or a diisocyanate with a lactam. A particularly suitable lactam is caprolactam. In principle, the isocyanate groups have reacted with a lactam molecule to form the following compound(s):

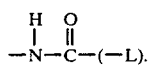

In the process according to the invention, the compounds having the following formula can be formed:

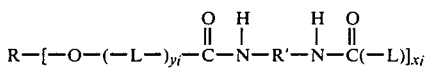

wherein:
R is a polyol originating from a polyol having the formula $R-(OH)_{x_i}$, where
$x_i$ is an integer $\geq 2$
R' is an alkyl, aralkyl, alkaryl or aryl group, whether or not cyclic,
$Y_i$ is an integer $\geq 0$,
(—L) is an unopened lactam ring and
(—L—) is an opened lactam block.

Exemplary R' groups include, for instance, hexamethylene, toluyl, difenymethylene and 1,5-hexyl.

R groups include, for instance, polyethylene glycol, polypropylene glycol and copolymers thereof, ethoxylated and/or propoxylated triols and tetrols.

The —L— and —L groups can be derivatives of an identical lactam ring. Advantageously, the lactam ring has from 5 to 12 carbon atoms.

Depending on the reaction conditions, a different $Y_i$ value may apply for each carbamoyl lactam group bound to the polyol. The $Y_i$ value depends on whether the lactam group is eliminated or is opened during the reaction. If the lactam group is eliminated, $Y_i$ equals zero. If the lactam group is opened, it will be 1. However, in certain cases it may be advantageous that a relatively small polyamide block is formed between the polyol and the poly-isocyanate.

The presence of an opened lactam group in the N-substituted carbamoyl lactam compound can have an advantageous effect upon the mechanical properties of the nylon block copolymer prepared therewith. Such lactam groups have a tendency to influence the behavior of the activator molecule in the partially polymerized polyol-lactam system. It is presently believed that during polymerization the activator precipitates from the lactam-polyamide system. The presence of some lactam groups apparently either prevents premature phase separation, or, alternatively forces the activator-groups to the phase boundary. In both situations, this means that the activator groups can advantageously perform the desired objects for a greater length of time during the polymerization reaction.

The amount of eliminated lactam groups, as a fraction of the theoretically possible amount, ranges from about 0.01 to about 0.95. More particularly the amount of eliminated lactam groups is between about 0.50 and about 0.75. Intermediate lower values, however, such as 0.05, 1.10 and 0.25 are also suitable. The mean value of $Y_i$ is, therefore, 1 minus the amount of eliminated lactam. The amount of opened lactam blocks is determinated by the kind of catalyst as can be seen in the examples.

Various catalysts can be used for the process of the invention. The amount of the catalyst may vary and generally ranges from 0.5 mole % to 15 mole % of the lactam blocked isocyanate compound. Suitable catalyst are various metal compounds, such metal compounds contain a metal or metals selected from the groups IA, IB, IIA, IIB, IIIA, IIIB, IVA, IVB, VB, VIB, VIIB and VIII.

More particularly, it is advantageous to use a group IA, IIA of VIII-metal compounds.

In a special embodiment of the present invention it is advantageous to use Lewis Acids. In most cases Lewis acids have no catalytic activity for the lactam polymerization but only for the reaction between polyol and the lactam blocked isocyanate.

Examples of suitable catalysts are bromomagnesium lactamate, sodium lactamate, potassium lactamate, magnesium chloride, calcium ethoxide, calcium lactamate, calcium acetylacetonate, barium lactamate, barium chloride, barium acetylacetonate, zinc chloride, zinc acetylacetonate, zinc lactamate, cadmium chloride, cadmium acetyl acetonate, cadmium lactamate, boron acetylacetonate, aluminium trilactamate, aluminium chloride, chloroaluminium dilactamate, lactam aluminium chloride, tin(II)chloride, tin(II)ethoxide, tin(II) actylacetonate, titanium trichloride, titanium (III) acetylacetonate, titanium (III) ethoxide, vanadium (III) ethoxide, vanadium (III) acetylacetonate, vanadium (III) chloride, chromium (III) chloride, chromium (III) acetylacetonate, manganese (II) chloride, manganese (II) acetylacetonate, iron (III) chloride, iron (III) acetylacetonate, iron (II) acetylacetonate, cobalt (II) chloride, cobalt (II) acetylacetonate, nickel acetylacetonate, nickel chloride, chromium (III) acetate, copper (II) acetylacetonate.

As a polyol various organic hydroxy compounds can be used such as, for instance, polyfunctional hydroxy compounds having at least two hydroxyl groups per molecule. Generally, the known polyols may be employed. Advantageously, the polyol is a polyetherpolyol, polyesterpolyol, polybutadienepolyol, siloxane containing polyol and/or a so-called 'polymeric' polyol. The 'polymeric' polyols as defined herein include graft polymers obtained by grafting one or more ethylenically unsaturated monomers onto a polyether polyol as well as the polyurea dispersions in polyols (PUD). These polyurea dispersions can be obtained by dissolving a diamine or hydrazine together with a diisocyanate in stoichiometric amounts in a polyol and reaction the dissolved compounds to form a polyurea compound dispersed in the polyol. The amount of polyurea dispersed in the polyol is from 10–35% by weight of the total dispersion.

The amount of the ethylenically unsaturated monomer grafted on the polyol ranges from about 10 to about 35% by weight on the final grafted product ('polymeric' polyol). Examples of especially suitable grafting monomers are acrylonitrile or a mixture of styrene and acrylonitrile. A suitable commercial product of this type is known as Niax 31-28 produced by Union Carbide Corporation.

Advantageously these 'polymeric' polyols may be employed to yield a product (nylon block, copolymer) having a higher flexural modulus while, surprisingly, avoiding a decrease in impact resistance. Other examples of polyols that can advantageously be used are the poly(oxyethylene) and poly(oxypropylene) adducts (or blends thereof) of diols, triols and tetrols, polyols with polyether segments containing polyesters, polyester polyamine-polyols and polylactones. Polyols obtained by ethoxylating and/or propoxylating ethylene diamine, glucose, fructose, saccharose or trimethylolpropane are also suitable.

The polyols described hereinabove are mainly of a relatively high molecular weight. Advantageously, the equivalent weight of these polyols is at least 300; more particularly the equivalent weight ranges between about 1000 and about 2500. In these ranges optimal properties of the final object are obtained, viz. a high impactstrength combined with a high flexural modulus without problems in preparing the activator, due to high viscosity.

It is to be understood that any molecular weight, or equivalent weight, referred to herein are numerical average weights. Furthermore, the term equivalent weight of a polyol is understood to mean the numerical average weight of the polyol per hydroxyl group, i.e. the molecular weight divided by the functionality.

The lactam terminated diisocyanate can be prepared by reacting lactam such as caprolactam, and a diisocyanate, such as hexamethylenediisocyanate, isophorondiisocyanate, toluenediisocyanate, methylene bis(phenyl-isocyanate) MDI and hydrogenated MDI, or modified MDI such as carbodiimide modified MDI, (Isonate 143L, Upjohn Company or Mondur PF, Mobay Chemical Corporation) and diol extended prepolymers of MDI (Isonate 181 or 191).

Other possible isocyanates include, for example, XDI, H$_6$XDI, and hydrogenated TDI.

As already indicated, preferably the reaction medium is a molten lactam. More particularly, a suitable lactam is caprolactam. It is also possible, however, to carry out the reaction in another solvent which is inert to the polyisocyanate, such as a lactone. Such suitable alternative solvents include toluene, xylene, caprolactone and dodecanolactone. In addition, a mixture of lactam with an inert solvent or a mixture of different lactams may be used. Such lactams include, for instance, caprolactam and dodecanolactam.

The ratio of the reaction products depends on their functionality and on the desired properties of the end product. In general, per equivalent of hydroxyl groups in the polyol to be used, at least one equivalent of lactam-blocked diisocyanate will be used, so that, in principle, every hydroxyl group can react with one lactam-blocked diisocyanate molecule. In the case that a deficiency of diisocyanate is used, relative to the number of hydroxyl groups, for example 3 diisocyanate molecules per 4 hydroxyl groups, it is achieved that a number of polyol molecules combine, so that a higher-molecular polyol block is obtained.

The invention will now be further explained by the following non-limiting examples.

EXAMPLE I 295.9 g (0.75 mole) caprolactam-blocked hexamethylene diisocyanate, 79.1 g caprolactam and 750 g (0.375 mole) polypropylene glycol (a diol with a molecular weight of 2000, PPG 2000) were brought (warmed/heated) to 150° C. Then, while stirring, 13.4 g sodium lactamate dissolved in caprolactam was added. The amount of catalyst relative to the blocked diisocyanate was 2.5 mole %. Immediately after addition of the catalyst, an increase in viscosity of the reaction mixture was observed. After reaction for 1 hour at 150° C. the mixture was cooled to room temperature. Analysis showed that the amount of free caprolactam had increased, so that in at least part of the reaction caprolactam must have been eliminated. Polypropylene glycol and unreacted blocked diisocyanate were no longer detectable. The amount of eliminated caprolactam was 64%.

EXAMPLE II 5.9 g (0.015 mole) caprolactam-blocked hexamethylene diisocyanate, 1.6 g caprolactam and 20 g (0.01 mole) PPG 2000 were heated at 150° C. At this temperature, while stirring, 1.1 g sodium lactamate in caprolactam (10 mole % catalyst relative to blocked diisocyanate) was added. A reaction was allowed to continue for 15 minutes at 150° C. The reaction mixture was then cooled to room temperature. Neither polypropylene glycol nor unreacted blocked diisocyanate could be detected in the product. The amount of free caprolactam, however, had clearly increased, so that in at least part of the reaction caprolactam must have been eliminated.

EXAMPLE III (COMPARATIVE EXAMPLE)

5.9 g (0.015 mole) caprolactam-blocked hexamethylene diisocyanate, 1.6 g caprolactam and 20 g (0.01 mole) PPG 2000 were heated at 190° C. for 15 minutes, with stirring to obtain a product. After cooling the product to room temperature, no change of the initial composition was found to have occurred.

EXAMPLES IV THROUGH IX

Caprolactam-blocked hexamethylene diisocyanate, caprolactam and a polyol mentioned in Table I were heated to a temperature also mentioned in Table I.

With stirring at this temperature the sodium-lactamate catalyst was added.

TABLE I

| polyether polyol | | mol. wt. of polyol | eq L—$\overset{\overset{O}{\|\|}}{C}$—$\overset{\overset{H}{\|}}{N}$/ eq OH | mol % cat. relative to diisocyanate | reaction temperature °C. | reaction time min. |
|---|---|---|---|---|---|---|
| IV | Pluracol* TPE 4542 | appr. 4500 | 2 | 2 | 120 | 15 |
| V | Tetronic** 901 | appr. 4700 | 2 | 2 | 125 | 30 |
| VI | Tetronic 1104 | appr. 8300 | 2 | 2 | 100 | 15 |
| VII | Tetronic 1302 | appr. 7800 | 2 | 2 | 125 | 30 |
| VIII | Tetronic 707 | appr. 12000 | 2 | 2 | 100 | 30 |
| IX | PPG*** 4000 | appr. 4000 | 2 | 2 | 110 | 30 |

*Pluracol is a triol
**Tetronic is a tetraol
***PPG is a diol

EXAMPLE X 20 g (0.05 mole) of caprolactam blocked toluenediisocyanate in 5 g of caprolactam and 50 g (0.025 mole) of PPG 2000 were heated to 150° C. At this temperature 1.9 g (1.9 mmole) of lactammagnesium bromide was mixed in. After 2 hours at 150° C. the mixture was cooled to room temperature.

Upon analysis it was found that 60% of the lactam was eliminated, and that no free PPG 2000 and lactam blocked toluenediisocyanate could be detected.

EXAMPLE XI 50 grams of caprolactam-blocked hexamethylene diisocyanate, containing 39.5 grams (0.1 mol) of blocked diisocyanate and 10.5 grams of caprolactam, and 100 grams (0.05 mol) of polypropylene glycol (a diol with a molecular weight of 2000, PPG 2000) were brought to 150° C. Then 0.93 grams of aluminum chloride were added, with stirring. Immediately after addition of the catalyst an increase in viscosity of the reaction mixture was observed. At half-hour intervals a sample was taken from the reaction mixture and was analyzed for the presence of unreacted caprolactam-blocked hexamethylene diisocyanate and unreacted polypropylene glycol. Both substances were no longer detectable after reaction for two hours. All caprolactam was eliminated.

EXAMPLE XII 50 grams (0.1 mol) of caprolactam-blocked hexamethylene diisocyanate, with the same composition as in Example I, and 100 grams (0.05 mol) of PPG 2000 were brought to 125° C. At this temperature, 6 grams (6 mmol) of caprolactam magnesium bromide in caprolactam were added, with stirring. At half-hour intervals the reaction mixture was sampled. After reaction for 3 hours, polypropylene glycol and unreacted blocked diisocyanate were no longer detectable.

EXAMPLE XIII 25 grams (0.05 mol) of caprolactam-blocked hexamethylene diisocyanate and 67 grams (0.0033 mol) of PPG 2000 were brought o 150° C. Then, with stirring, 0.70 grams (1.4 mmol) of magnesium bislactamate in caprolactam were added. At half-hour intervals a sample was taken from the reaction mixture. After 1 hour, polypropylene glycol and unreacted blocked diisocyanate were no longer detectable. 75% of the caprolactam was eliminated.

EXAMPLE XIV (COMPARATIVE EXAMPLE)

7.5 grams (0.015 mol) of caprolactam-blocked hexamethylene diisocyanate and 20 grams (0.01 mol) of PPG 2000 were heated at 150° C. for 1 hour, with stirring. After cooling to room temperature, no change of the initial composition was found to have occurred.

EXAMPLES XV THROUGH XXVI

By analogy to Example XI, using the specified amounts of caprolactam-blocked hexamethylene diisocyanate and PPG 2000 indicated therein, the reaction there with an N-carbamoyllactam compound was carried out at 150° C. using different catalysts.

Table II indicates the catalyst used, the amount in which it was used and the time it took for unreacted starting products to become undetectable in a sample (on the analogy of Example I).

TABLE II

| Catalyst | | amount (g) | time (hours) | eliminated caprolactam (%) |
|---|---|---|---|---|
| XV | magnesium chloride | 0.67 | 3 | * |
| XVI | nickel acetylacetonate | 1.8 | 0.5 | 100 |
| XVII | aluminium chloride | 0.13 | 5 | — |
| XVIII | nickel chloride | 0.99 | 1 | 100 |
| XIX | iron (III) acetyl acetonate | 2.65 | 1 | 57 |
| XX | iron (II) acetyl acetonate | 1.91 | 4 | — |
| XXI | zinc acetyl acetonate | 1.98 | 1.5 | 100 |
| XXII | cobalt acetyl acetonate | 1.93 | 0.5 | — |
| XXIII | manganese (II) acetyl acetonate | 1.90 | 0.5 | — |
| XXIV | chromium (III) acetate | 1.72 | 2.5 | — |
| XXV | aluminium acetyl acetonate | 2.43 | 1 | — |
| XXVI | copper (II) acetyl acetonate | 1.92 | 1 | — |

*means: not determined

What is claimed is:

1. A process for preparing a N-substituted carbamoyl-lactam compound by reacting a polyol having an equivalent weight of at least 300 and ranging up to about 2500, with a lactam-blocked polyisocyanate in the liquid state in the presence of a metal compound catalyst.

2. A process according to claim 1, wherein the metal component of said catalyst is a metal from Group IA, IB, IIA, IIB, IIIA, IIIB, IVB, VB, VIB, VIIB or VIII.

3. A process according to claim 2, wherein said catalyst contains a Group IA metal, or is a Lewis acid.

4. A process according to claim 3, wherein said catalyst is sodium lactamate, potassium lactamate or a Grignard compound.

5. A process according to claim 1, wherein the polyisocyanate residue of said lactam-blocked polyisocyanate is selected from the group comprising 1,6-hexane diisocyanate, 1,5-hexane diisocyanate, MDI, isophorone diisocyanate, toluene diisocyanate, hydrogenated MDI, or a combination thereof.

6. A process according to claim 1, wherein the reaction is carried out in molten lactam.

7. A process according to claim 6, wherein said lactam is caprolactam.

8. A process for preparing a N-substituted carbamoyl-lactam compound consisting essentially of reacting a polyfunctional hydroxy compound having a hydroxyl functionality of at least two and an equivalent weight per hydroxyl group between about 1000 and 2500 with a lactam-blocked polyisocyanate in molten lactam in the presence of a metal-lactamate catalyst or a Lewis acid at a temperature ranging between the melting point of said lactam or the lactam polyol mixture and 150° C.

9. Process according to claim 8, wherein said catalyst is a Lewis acid.

10. Process according to claim 8, wherein said molten lactam is caprolactam.

11. Process according to claim 8, wherein the polyisocyanate residue of said lactam-blocked polyisocyanate is 1,6-hexane diisocyanate.

12. A process for preparing a nylon block copolymer by reacting a lactam in the presence of an activator and a basic lactam catalyst, wherein said activator is an N-substituted carbamoyl-lactam compound having the following formula:

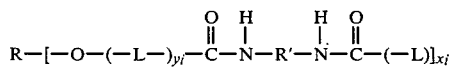

wherein said formula:
R is the residue derived from a polyol, said polyol having the formula R—(OH)$_{xi}$, where
$x_i$ is an integer $\geq 2$,
R' is the residue derived from a diisocyanate,
$y_i$ is an integer 0,
(—L) represents a lactam ring having the formula

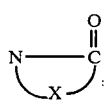

wherein x is the alkylene group of the lactam ring, and
(—L—) represents an opened lactam ring having the formula

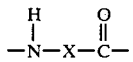

wherein X is the alkylene residue derived from said lactam ring.

13. Process according to claim 12 wherein said lactam is caprolactam.

14. Process according to claim 12 wherein said X or x represents a 5 to 12 carbon alkylene group.

15. A process according to claim 1 wherein said polyol is selected from the group consisting of polyether polyols, polyester polyols, polybutadiene polyols, siloxane containing polyols, graft polymers obtained by grafting one or more ethically unsaturated monomers onto a polyether polyol, polyurea dispersions in polyols, poly(oxyethylene) adducts of diols, poly(oxyethylene) adducts of triols, poly(oxyethylene) adducts of tetrols, poly(oxypropylene) adducts of diols, poly(oxypropylene) adducts of triols, poly(oxypropylene) adducts of tetrols, polyester polyamine-polyols, polylactones, an ethoxylated ethylene diamine, an ethoxylated gluucose, an ethoxylated fructose, an ethoxylated saccharose, an ethoxylated trimethylolpropane, a propoxylated ethylene diamine, a propoxylated gluccose, a propoxlyated fructose, a propoxylated saccharose, a propoxylated trimethylolpropane, and mixtures thereof.

* * * * *

UNITED STATES PATENT AND TRADEMARK OFFICE
CERTIFICATE OF CORRECTION

PATENT NO. : 4,540,516

DATED : September 10, 1985

INVENTOR(S) : ALBERT A. VAN GEENEN, et al.

It is certified that error appears in the above-identified patent and that said Letters Patent is hereby corrected as shown below:

Column 10, line 57, should read:

--$y_i$ is an integer $\geq 0$--.

Signed and Sealed this

Twenty-first Day of January 1986

[SEAL]

Attest:

DONALD J. QUIGG

Attesting Officer

Commissioner of Patents and Trademarks